United States Patent [19]

Tsuji

[11] Patent Number: 4,708,444
[45] Date of Patent: Nov. 24, 1987

[54] PHOTOGRAPHIC OBJECTIVE

[75] Inventor: Sadahiko Tsuji, Kanagawa, Japan

[73] Assignee: Canon Kabushiki Kaisha

[21] Appl. No.: 582,457

[22] Filed: Feb. 22, 1984

[30] Foreign Application Priority Data

Mar. 1, 1983 [JP] Japan .................................. 58-33441
Mar. 1, 1983 [JP] Japan .................................. 58-33442

[51] Int. Cl.$^4$ ......................... G02B 15/22; G02B 9/34;
G02B 9/14; G02B 9/10
[52] U.S. Cl. .................................. 350/427; 350/255;
350/415; 350/428; 350/450
[58] Field of Search ................ 350/255, 427, 428, 415,
350/450

[56] References Cited

U.S. PATENT DOCUMENTS

| 4,256,381 | 3/1981 | Kreitzer | 350/450 |
| 4,390,252 | 6/1983 | Mori | 350/255 |
| 4,426,137 | 1/1984 | Mori | 350/255 |
| 4,492,437 | 1/1985 | Masumoto et al. | 350/428 |

Primary Examiner—Bruce Y. Arnold
Assistant Examiner—Rebecca D. Gass
Attorney, Agent, or Firm—Toren, McGeady & Associates

[57] ABSTRACT

In the disclosed photographic objective, a focusing lens group is arranged on the image side of a stop. To focus, all or part of the lens group, or the stop and all or part of the lens group, are moved to maintain an exit pupil at a substantially constant position.

9 Claims, 3 Drawing Figures

PHOTOGRAPHIC OBJECTIVE

BACKGROUND OF THE INVENTION

1. Field of the Invention

This invention relates to photographic objectives and more particularly to photographic objectives of the rear focus type in which one or more lens components on the image side of a stop is or are movable for focusing the objective.

2. Description of the Prior Art

Color cameras having color separation prisms or other color separation optical systems such as stripe filters or mosaic filters should offer good color reproducing characteristics. To achieve this end it is generally recommended that their photographic objectives have an exit pupil at as long a distance as possible (preferably at least 200-300 mm, and ideally infinity) and that that distance be left unchanged. Even for an objective having a shortened exit pupil distance, as is sometimes necessary in actual practice, facilitating an electrical correction of the color reproduction makes it desirable that the exit pupil distance remain constant.

At the same time, the use of one of the constituent lens members which lies on the image side of the diaphragm for focusing purposes, or the employment of a so-called rear focus type of photographic objective, is advantageous for reducing the weight and the complexity of mechanical focus control signal transmission. This is so because the distance between the focusing member and the camera body is short. For this reason, a growing number of photographic objectives of this type have been developed in recent years.

As usual, the rear focus type of photographic objective is associated with a change of the position of the exit pupil resulting from the movement of the focusing member that lies behind the diaphragm. Therefore, application of this type of objective to color cameras with color separation optical systems poses a problem with respect to the color reproductivity.

This problem is also encountered when a zoom lens has its diaphragm in a space between the zoom components.

A proposal has been made to move the diaphragm of a zoom lens and one of the zoom components so as to maintain the position of the exit pupil constant. This appears in Japanese Patent Publication No. SHO 51-4135 (published Nov. 9, 1976).

SUMMARY OF THE INVENTION

It is an object of the invention to provide a photographic objective which focuses with a movable component or components on the image side of a diaphragm, i.e. an objective of the rear focus type, while still maintaining the position of an exit pupil constant.

To achieve this, one of the features of the invention is that at least two movable components for focusing are arranged on the image side of a diaphragm, and as these components are moved axially in different relation from each other, the paths of movement of the focusing components are so defined that in case the diaphragm is taken as an object point, the position of an image point is not caused to change by focusing while the diaphragm is made either stationary or movable with focusing. This makes it possible to maintain the position of the exit pupil.

DETAILED DESCRIPTION OF THE PREFERRED EMBODIMENTS

Figure 1:
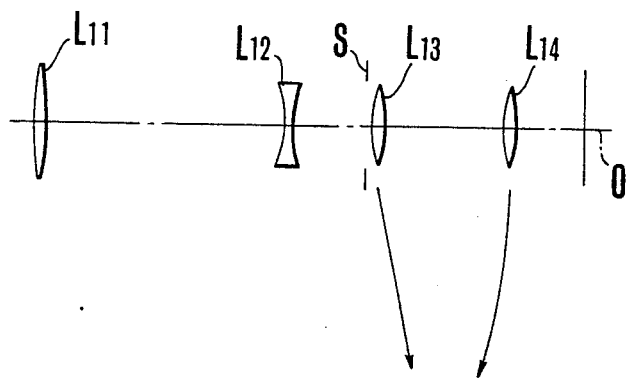
FIGS. 1, 2 and 3 are schematic diagrams indicating different configurations of embodiments of photographic objectives according to the present invention respectively.

FIG. 1 illustrates a first embodiment of a photographic objective of the rear focus type according to the present invention. The objective includes, from front to rear, positive first and negative second components L11 and L12 which remain stationary during focusing, a stop S and positive third and positive fourth components L13 and L14 which are movable for focusing.

Shown in the lower half of the figure are arrow-marked lines indicating the different relations of the components L13 and L14 as they are moved axially during focusing.

In the above-described configuration, the components L13 and L14 which lie on the image side of the stop S are made movable for focusing. The ratio of their axial movements is determined so that as the stop S is taken as an object for the components L13 and L14, an image point (corresponding to the position of an exit pupil of the entire system) remains constant. This maintains the constant position of the exit pupil against focusing despite independent movement of the components which lie on the image side of the stop (in this instance, L13 and L14).

In the following equations f3 designates the focal length of the lens component L13, f4 the focal length of the lens component L14, e3 the axial distance between the stop S and the lens component L13, e4 the axial distance between the lens component L13 and the lens component L14, $\alpha 3$ an inclination angle of the light beam between the stop S and the lens component L13 with respect to the optical axis 0, $\alpha 4$ an inclination angle of the light beam between the lens component L13 and the lens component L14 with respect to the optical axis 0, h the height of the light beam in the lens component L13 from the optical axis 0, and d the axial distance between the lens component L13 and an image of the stop S formed by the lens component L13 when assuming the stop S to be an object point (a back focus of the lens component L6).

Then, in order to set the position of the exit pupil at infinity by means of the lens components L13 and L14, it is necessary that the front focus of the lens component L14 be arranged to coincide with the image point of the image of the stop S formed by the lens component L13. Thus, the formula (1) must be satisfied.

$$e4 = d + f4 \quad (1)$$

Here, if the paraxial tracing is performed assuming the stop S to be the object point, formulas (2), (3) and (4) are obtained.

$$\alpha 3 = -h/e3 \quad (2)$$

$$\alpha 4 = \alpha 3 + h/f3 \quad (3)$$

$$d = h/\alpha 4 \quad (4)$$

Therefore, d is represented by:

$$d = \frac{e3 \cdot f3}{e3 - f3} \quad (5)$$

Hence, the formula (1) is replaced by:

$$e4 = \frac{e3 \cdot f3}{e3 - f3} + f4 \quad (6)$$

Thus, if e4 is changed so as to satisfy the formula (6) according to the change of e3, the position of the exit pupil can always be held at infinity. Values f3, f4 and e3 may be set as desired. Then if the paraxial reverse tracing of the entire lens system L11–L14 is performed from the image point so as to make the image point constant in space, the position of the object can be obtained as the conjugate point.

A numerical specific embodiment shown in FIG. 1 can be constructed in accordance with the data given in the following table in which:

f: the focal length of the entire system;
f1–f4: the focal lengths of the individual components L11–L14, respectively;
e1–e4: the axial spacings between the successive two components and the stop;
s'k: the back focal length;
t'k: the distance of the exit pupil;
s1: the object distance measured from the first component L11; and
subscripts A–D: different focusing positions from one another.

| f=52.15 | | A | B | C | D |
|---|---|---|---|---|---|
| L11 | f1=60 | | | | |
| | | e1A=41.61 | | | |
| L12 | f2=−12 | | | | |
| | | e2A=13 | | | |
| S | | | | | |
| | | e3A=2 | e3B=4 | e3C=6 | e3D=8 |
| L13 | f3=24 | | | | |
| | | e4A=21.82 | e4B=19.2 | e4C=16 | e4D=12 |
| L14 | f4=24 | | | | |
| | | s'kA=12.18 | s'kB=12.8 | s'kC=14 | s'kD=16 |
| | | t'kA=−∞ | t'kB=−∞ | t'kC=−∞ | t'kD=−∞ |
| | | s1A=−∞ | s1B=−5597 mm | s1C=−1301 mm | s1D=−3139 mm |

As is obvious from the table listed above, it will be understood that the position of the exit pupil is left unchanged despite focusing.

An operating mechanism for the lens components L13 and L14 may be constructed in the form of cam means or the like.

Though the first embodiment has been illustrated as applied to a fixed-focal length objective, it can be applied to a zoom objective whose zoom components lie on the front side of the stop without any alteration of the paths of focusing movement of the components L13 and L14. In this case, however, the positions of the lens components L13 and L14 must be adjusted in accordance with not only the object distance but also the focal length of the entire system. This is so because the distance each focusing component moves from the position with an infinitely distant object to focus on the same object distance varies as zooming is performed. It is also possible to make movable the components on the image side of the stop during zooming to contribute to a variation of the image magnification. If so, it results in the components L13 and L14 having both the zooming and focusing functions.

Also if there are at least three components on the image side of the stop, another modification becomes possible. As is generally well known, the optically compensated zoom lens is operated by moving two components as a unit on either side of a component which remains stationary during zooming while still maintaining substantially constant the position of an image plane. In this analogy, for focusing purposes, the intermediate one of the three components is made stationary, and the other two are constructed in the form of an optically compensated zoom lens for the stop as an object and arranged to move axially as a unit to effect focusing on an object to be photographed. This affords the advantage of excluding an elaborate operating mechanism such as cam means when the object of the present invention is accomplished.

Figure 2:
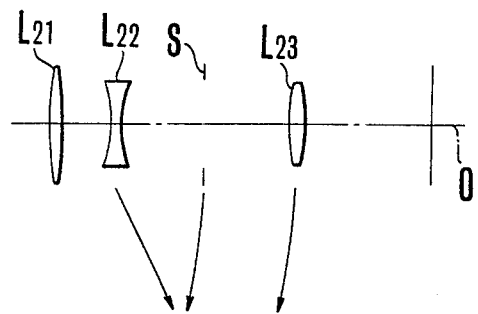

FIG. 2 schematically illustrates the configuration of a zoom lens of the rear focus type constituting a second embodiment of the present invention. The zoom lens includes, from front to rear, a positive first component L21 which remains stationary during zooming, a negative second component L22 for zooming, a stop S, and a positive third component L23 for zooming and focusing.

Shown in the lower half of FIG. 2 is a different relation in which the zoom components L22 and L23 and stop S move axially to effect zooming.

In the aforesaid configuration, the stop S is arranged to move during zooming, though not essential to the present invention, to maintain the position of the exit pupil constant when zooming.

In this embodiment, the third component L23, which lies on the image side of the stop S, is made to also serve as a focusing component. When focusing, this component L23 moves axially. Therefore, despite the position of the stop S having been adjusted in accordance with the zooming position, moving the third component L23 later to effect focusing causes the exit pupil to shift as the stop S remains stationary.

On this account, the stop S is made to move in connection with the third component L23 when focusing, so the position of the exit pupil is always maintained constant even when focusing. This constitutes a feature of this embodiment.

For example, in order always to maintain the exit pupil of the entire lens system at an infinite distance during focusing so as to render the exit pupil constant in the present embodiment, it is sufficient to keep the following relation between the diaphragm DS and the lens group L23. Thus, in the present embodiment, as the image of the stop S formed by the lens group L23 is the exit pupil of the entire lens system, it is enough to move the stop S and the lens group L23 so as to always make the space e7 therebetween coincide with the focal length of the lens group L23.

A numerical specific second embodiment can be constructed in accordance with the data given in the following table in which:

f: the focal length of the entire system;

f5-f7: the focal lengths of the first to third components, respectively;

e5-e7: the axial spacings between the successive two components and the stop;

s'k: the back focal length;

t'k: the distance from the component L3 to the exit pupil; and subscripts W and T: the wide angle and telephoto settings, respectively.

|     |          | fW = 20      | fT = 53.33   |
| --- | -------- | ------------ | ------------ |
| L21 | f5 = 80  |              |              |
|     |          | e5W = 20     | e5T = 40     |
| L22 | f6 = −20 |              |              |
|     |          | e6W = 30     | e6T = 5      |
| S   |          |              |              |
|     |          | e7W = 30     | e7T = 30     |
| L23 | f7 = 30  |              |              |
|     |          | s'kW = 45    | s'kT = 50    |
|     |          | t'kW = −∞   | t'kT = −∞   |

In this second specific example, when in the wide angle position, a forward axial movement of the third component L23 along with the stop S by 0.329 mm results in focusing down to an object distance s1 = −1588.57 mm measured from the first component L21, leaving the position of the exit pupil unchanged from t'k = −∞. This makes it possible to maintain the position of the exit pupil constant during focusing.

Also, in the telephoto position, forward axial movement of the third component L23 along with the stop S by 4 mm results in focusing down to an object distance s1 = −1588.57 mm leaving the position of the exit pupil unchanged from t'k = −∞. This makes it possible to maintain the position of the exit pupil constant during focusing as well as during zooming.

Thus, in the objective having the focusing facility in only one component on the image side of the stop, imparting a concurrent movement with the movement of the focusing component into the stop, makes it possible to maintain the position of the exit pupil constant throughout the entire focusing range. This advantageously eliminates the problem that would otherwise arise were the rear focus type employed in designing photographic objectives for color cameras having the color separation optical system for the purpose of reducing the bulk and size of the camera as a whole.

Figure 3:
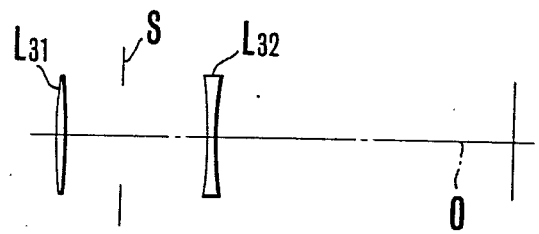

FIG. 3 illustrates another embodiment of the invention applied to a fixed focal length objective of the telephoto type having a positive front component L31 and a negative rear component L32 for focusing with a stop S therebetween.

As described herein later, the embodiment is limited in the position of the exit pupil so that if the space e9 between the stop S and the lens group L32 is kept constant, the position of the exit pupil measured on the basis of the image plane changes. In such a case, it is necessary to change the space e5 between the stop S and the lens group L32 in correspondence to the focusing. The change of the space e5 may be determined by the following relation. Supposing the space when the lens group L32 has moved d' from the state of the space e9' is e9, and the position of the exit pupil measured from the initial lens group L32 is t'ko, $$\frac{1}{t'ko} + \frac{1}{e9'} = \frac{1}{f9}$$

$$\frac{1}{t'ko + d'} + \frac{1}{e9} = \frac{1}{f9}$$

From the above relation, the space e9 required for maintaining constant the position of the exit pupil measured on the basis of the image plane can be obtained. An example of an objective of this configuration can be constructed in accordance with the following numerical data:

|     |          |          |
| --- | -------- | -------- |
| L31 | f8 = 100 |          |
|     |          | e8 = 20  |
| S   |          |          |
|     |          | e9 = 30  |
| L32 | f9 = −100|          | where the focal length of the entire system f = 200; the back focal length s'k = 100; and the exit pupil distance from the negative component L32, t'k = −23.07692 (from the image plane, −123.07692).

Now assuming that the negative component L32 is solely moved axially rearward, for example, 10 mm to effect focusing down to an object distance s1 = −1457.14 mm, then the exit pupil is shifted to t'k = −28.57142 (from the image plane, −118.57143). According to the invention, simultaneously with this, the stop S is made to move forward 9.42528 mm, leaving the exit pupil stationary at t'k = −23.07692 (from the image plane, −123.07692).

Such concurrent movement of the stop with focusing and, in the second embodiment, with zooming can be realized by using cam means. It is also to be noted that upon consideration of preventing the aperture ratio from changing as the stop moves, it is desirable in actual practice to provide a suitable automatic diaphragm aperture adjusting mechanism.

Also in the present invention, the sentence "the exit pupil position is maintained substantially constant" implies, of course, the case when it is held in exactly constant a position, but also another case when the exit pupil position is allowed to shift within an acceptable range for actual performance with respect to the color reproductivity.

The present invention is applicable to other lens types and zoom types than those shown in connection with its embodiments. For example, in fixed focal length objectives, it is applicable not only to the telephoto type, but also to the retrofocus type suited for wide angle objectives, and to various other types for use in standard objectives; in zoom lenses, it is not confined to the 3-component type shown in the foregoing embodiments, but also to more-than-3-component types, for example, the 4-component type; conversely in the 2-component type; and further regardless of what relative position the zoom components take, and the number of zoom components, to all other types of zoom lenses, to effect an equivalent result.

As has been described in greater detail above, according to the present invention, the use of a component or components which lies or lie on the image side of the stop for, focusing purposes, or the employment of the so-called rear focus type in single lenses and zoom lenses for color cameras provides a possibility of stabilizing good color reproductivity against focusing so that a minimization of the bulk and size of the camera due to the employment of the rear focus type can be advantageously achieved without involving any decrease in optical performance.

What I claim:

1. A photographic objective comprising:
   a stop stationary during focusing;
   a plurality of lens components located on the image side of said stop and movable for focusing;
   said plurality of lens components moving in such a way as to maintain an image point of the stop at a substantially constant position when the stop is assumed as an object point.

2. A photographic objective according to claim 1, further including:
   a further lens component arranged on the object side of said stop.

3. A photographic objective according to claim 2, wherein said further lens component is a zoom lens.

4. A photographic objective according to claim 1, further including:
   a further lens component for zooming arranged on the object side of said stop and wherein at least one of said plurality of lens components moves together with said further lens component.

5. A photographic objective comprising:
   a front lens component stationary during focusing;
   a stop located on the image side of said front lens component and movable during focusing;
   a movable lens component located on the image side of said stop and movable for focusing;
   said stop and said movable lens component moving in such a way as to maintain an image point at a substantially constant position when the stop is assumed as an object point.

6. A photographic objective according to claim 5, wherein said front lens component moves simultaneously with said movable lens component for zooming.

7. A photographic objective according to claim 6, wherein said stop and said movable lens component move contrary to each other during focusing.

8. A photographic objective according to claim 5, wherein said stop and said movable lens component move all together during focusing.

9. A photographic objective comprising:
   a plurality of lens components stationary during focusing;
   a stop located on the image side of said plurality of lens components; and
   a movable lens component located on the image side of said stop and movable for focusing;
   said movable lens component moving in such a way as to maintain an image point at a substantially constant position when the stop is assumed as an object point.

* * * * *